Sept. 5, 1967     B. F. SUMMEROUR     3,339,528
EGG GATHERING DEVICE
Filed Jan. 5, 1966                                             2 Sheets—Sheet 1
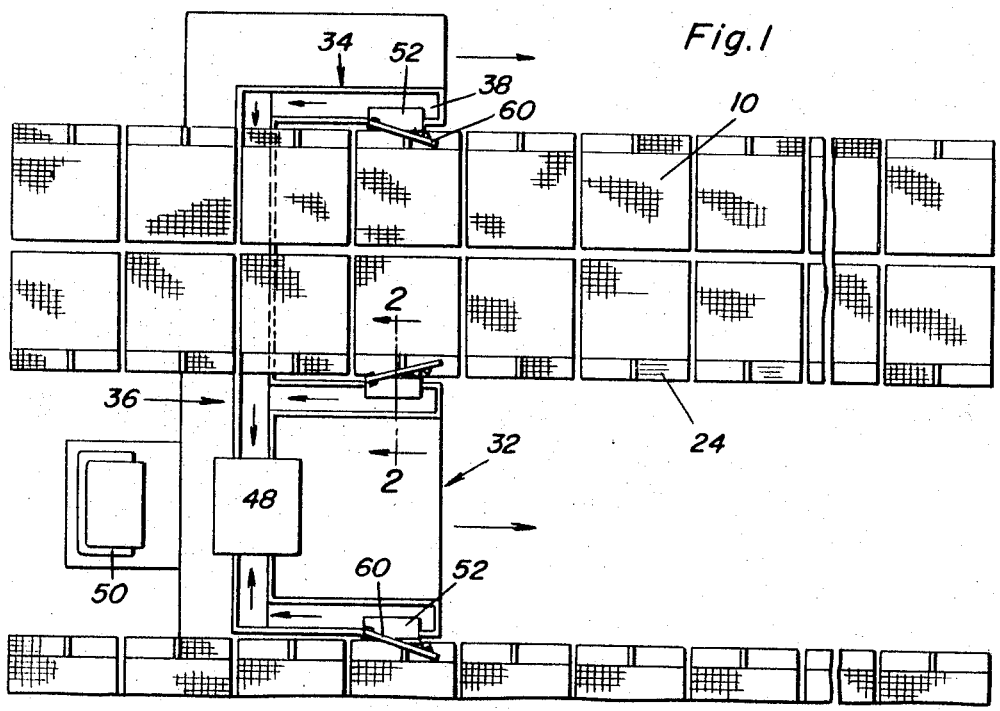
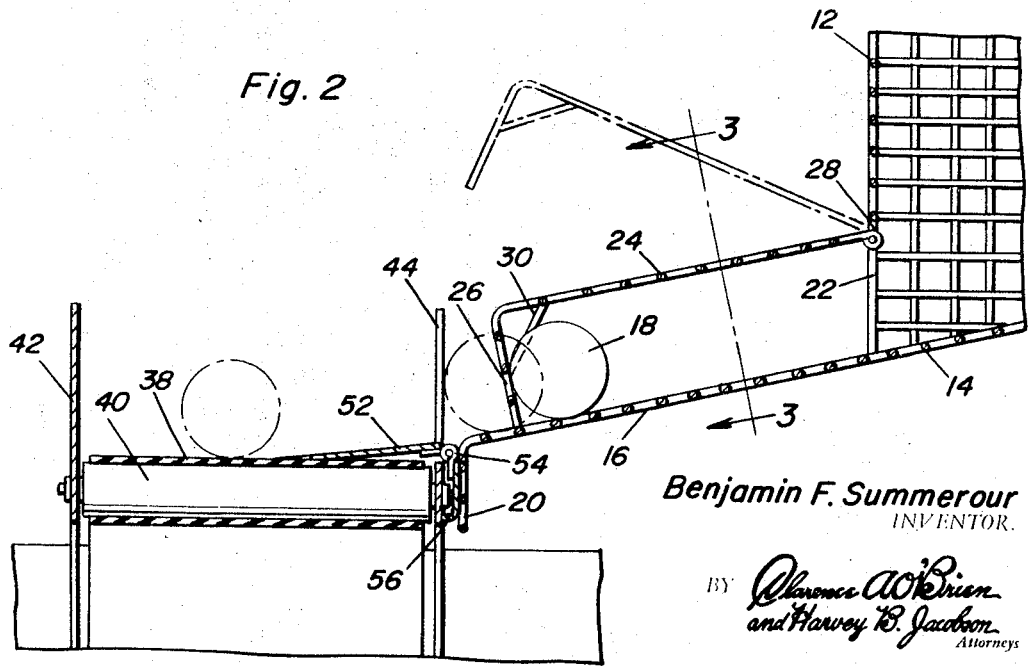
Benjamin F. Summerour
INVENTOR.
BY Clarence A. O'Brien
and Harvey B. Jacobson
Attorneys Sept. 5, 1967     B. F. SUMMEROUR     3,339,528
EGG GATHERING DEVICE
Filed Jan. 5, 1966     2 Sheets-Sheet 2
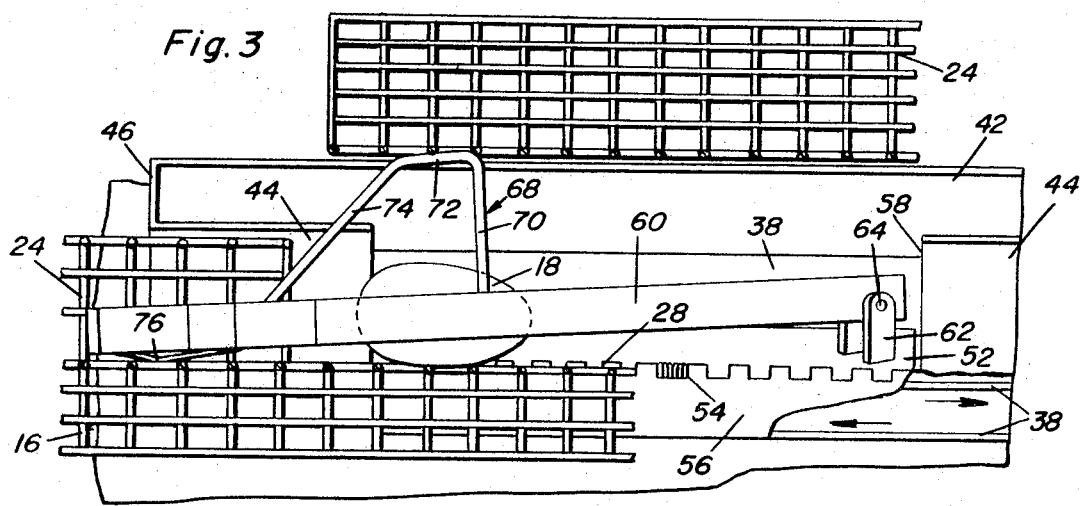
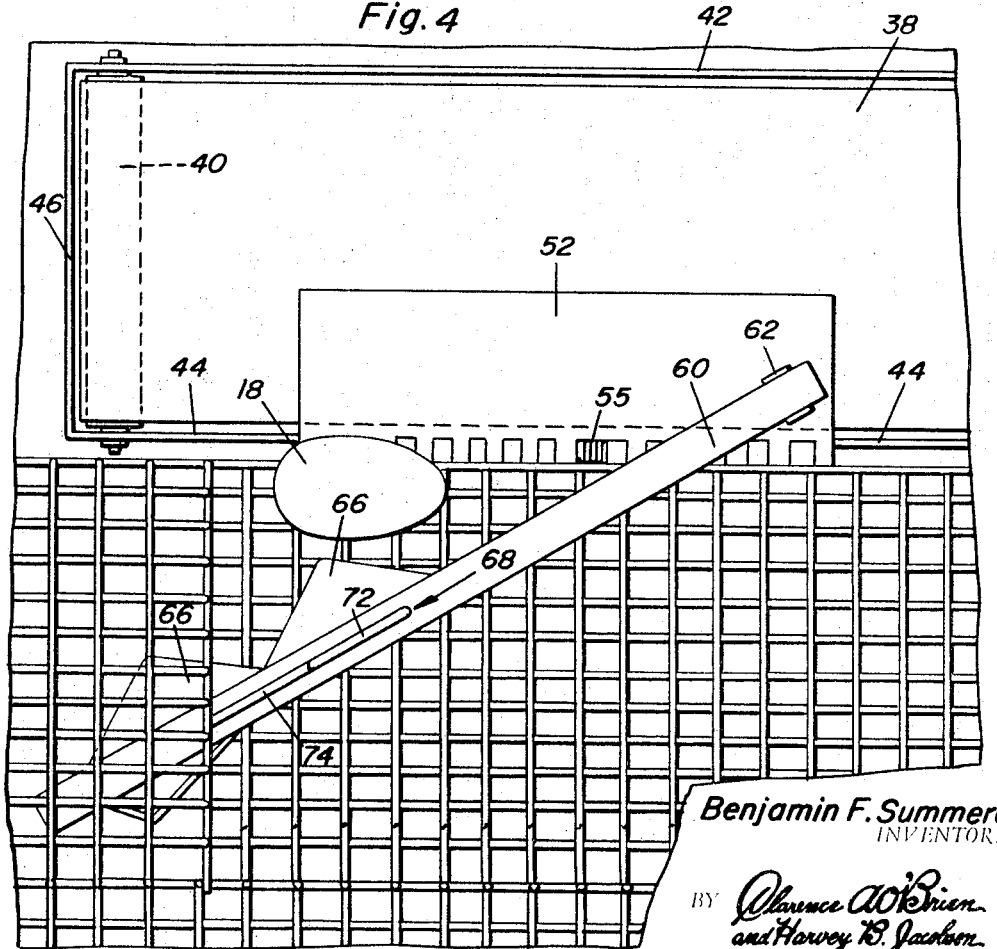
Benjamin F. Summerour
INVENTOR.
BY Clarence A. O'Brien
and Harvey B. Jacobson
Attorneys

United States Patent Office 3,339,528
Patented Sept. 5, 1967

3,339,528
EGG GATHERING DEVICE
Benjamin F. Summerour, 237 N. Peachtree St.,
Norcross, Ga. 30071
Filed Jan. 5, 1966, Ser. No. 518,962
8 Claims. (Cl. 119—48)

The present invention generally relates to an egg gathering device and more particularly to such a device for use with a battery of cages such as that disclosed in my prior Patent No. 3,158,137, issued Nov. 24, 1964 and involves a device for removing eggs from the egg tray and conveying them to a suitable receptacle or collection area.

An object of the present invention is to provide an egg gathering device for gathering eggs from the egg trays of a plurality of laying cages which involves briefly a device for lifting the egg gate, sweeping the eggs from the tray onto a conveyor and a device for conveying the eggs to a central location on a movable platform for subsequent further processing while still in the laying house or further processing may be conducted at a remote point.

Another object of the present invention is to provide an egg gathering device for use with a battery of egg laying cages each of which has a tray in the form of an inclined surface and including a conveyor extending along the outer edge of the tray so that eggs may roll directly from the tray onto the conveyor with an egg gate being pivotally attached to the cage and normally retaining the eggs on the tray with the egg gathering device including a structure for initially raising the egg gate and then sweeping the eggs laterally outwardly onto the conveyor.

Another important object of the present invention is to provide an egg gathering device which is relatively simple in construction, effective for gathering eggs without breakage, long lasting and dependable and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a plan view of a battery of cages, a movable carriage and the egg gathering device of the present invention incorporated thereon;

FIGURE 2 is a detailed sectional view taken substantially upon a plane passing along section line 2—2 of FIGURE 1 illustrating the manner in which the conveyor is associated with the egg tray and egg gate;

FIGURE 3 is a detailed sectional view taken substantially upon a plane passing along section line 3—3 of FIGURE 2 illustrating further structural details of the egg tray, gate and sweeping device; and FIGURE 4 is a detailed plan view illustrating the construction of the conveyor, transition plate, egg tray and gate together with the association of the egg sweeping device and egg gate lifting device.

Referring now specifically to the drawings, the numeral 10 designates a plurality of egg laying cages which are conventional wire mesh structure and are arranged in longitudinal rows to form a battery of cages each of which receives a hen while the hen is laying an egg. Each cage 10 includes a front wall 12 which is vertically disposed and an inclined bottom wall 14 which has an extension in the form of an egg supporting tray 16 which is coplanar with the inclined bottom wall 14 for supporting an egg or eggs 18 thereon. The outer edge of the egg tray 16 is provided with a downturned edge, lip or flange 20 and the egg tray 16 including the lip or flange 20 is constructed of wire mesh material for supporting the egg 18.

The front wall 12 is provided with a slot-like opening 22 at the bottom edge thereof where it joins with the bottom wall 14 thus providing an exit area or discharge opening for the egg 18 so that when a hen lays the egg on the inclined bottom 14, it will roll downwardly along the inclined bottom 14 onto the egg tray 16.

Disposed in spaced parallel relation to the egg tray 16 is an egg gate 24 which has a downwardly extending front flange 26 forming a retainer for the egg 18 when the front flange 26 rests against the egg tray 16. The other end of the gate 24 is provided with eye members 28 which hingedly mount the egg gate 24 on the front wall 12 at the upper edge of the opening 22 thereby enabling pivotal movement of the egg gate 24 from the full line position illustrated in FIGURE 2 to the dotted line position illustrated therein. Across the apex of the corner junction between the flange 26 and the portion of the egg gate 24 parallel to the egg tray 16, suitable bracing 30 is provided for rigidifying the egg gate 24 so that the egg gate 24 may pivot between the full line position illustrated in FIGURE 2 and the dotted line position illustrated in FIGURE 2. When the egg gate 24 is in the dotted line position in FIGURE 2, the egg 18, will, of course, be released thereby enabling the egg 18 to be rolled down the incline of the egg tray 16 or swept laterally outwardly of the egg tray 16.

Each of the egg laying cages is provided with two egg gates 24 which are independent of each other but are of identical construction. The egg tray is continuous across the width of the cage and any suitable wire mesh material having a suitable mesh size may be employed. When the line of cages is installed, it is preferable to align the front walls 12 as well as the bottom walls 14 and thus correspondingly align the egg trays 16 as well as the front flange 20.

As described in detail in prior Patent No. 3,158,137, a carriage generally designated by 32 is movable longitudinally of the laying house with, at least, portions thereof underlying the lines or battery of cages. Mounted on the carriage 32 is a plurality of longitudinal conveyors 34 each of which parallels the front edge of the egg tray 16 and also transverse conveyors 36 for conveying the eggs transversely of the carriage 32.

The longitudinal conveyors 34 include a longitudinally extending endless conveyor belt 38 entrained over end pullleys or rollers 40 which are supported by upstanding side members 42 and 44 which are supported in any suitable manner from the carriage 32. Across the leading end of the conveyor 34, an upstanding end member 46 is provided and is connected to the side members 42 and 44 all of which extend above the plane of the belt 38 to retain the eggs 18 thereon. The rear end of the conveyor 34 intersects the lateral or transverse conveyor 36 and deposits eggs thereon. The transverse conveyor 36 extends under the cages 10 and is offset slightly downwardly to enable the conveyor 36 to extend under the cages and ultimately deposit the eggs at a central station 48 which has an operator's seat 50 disposed adjacent thereto whereby a person may perform other operations on the eggs or place them in containers for further processing or the like.

Mounted on the carriage is a ramp or plate 52 which has one edge thereof resting against the belt 38 and the other edge thereof pivotally supported by a hinge bracket 54 from a mounting bracket or plate 56 carried by the side member 44 for positioning against the vertical flange 20 of the egg tray 16 as illustrated in FIGURE 2. Thus, the plate 52 forms a transition so that the eggs may roll from the egg tray 16 onto the conveyor belt 38 without breakage. As illustrated, the plate 52 extends through on open area 58 in the side member 44 and due to the hinge construction, the plate 52 will follow variations in the conveyor belt 38 and also close the gap between the edge of the egg tray 16 and the edge of the conveyor belt 38 which is provided with a certain degree of flexibility and would tend to form a crotch or valley for the eggs 18. However, the plate 52 provides a relatively smooth inclined ramp surface for the eggs 18 to roll down onto the conveyor 38.

Mounted on the plate 52 is an elongated egg sweeping arm 60 which has the rear end thereof pivotally supported from a pair of upstanding brackets 62 on the plate 52 with a pivot pin or fastener 64 interconnecting the upper ends of the brackets 62 and sweep arm 60 which extends forwardly in the direction of movement of the carriage and laterally inwardly of the egg tray 16 through the opening 58 as illustrated in FIGURES 1 and 4 with the inner end of the sweep arm terminating outwardly of the front wall 12 but at a point somewhat adjacent thereto so that any eggs resting on the tray 16 will be swept laterally outwardly of the tray and beyond the lift gate 24.

The edge of the sweep arm 60 which faces the eggs 18 as the sweep arm 60 approaches the eggs is provided with a plurality of corrugations or projections 66 which are generally V-shaped in configuration which serve to prevent the sweep arm from cradling two eggs together. In other words, the crotch area between the corrugations or projections 66 will only receive one egg thus retaining the eggs either inwardly of the first projection 66 or in the crotch area between the two projections 66 or even outwardly of the second projection 66 as illustrated.

The top of the sweep arm 60 is provided with a gate lifter generally designated by the numeral 68 which includes an upstanding rod 70 perpendicular to the top surface of the sweep arm 60 intermediate the ends thereof which has a horizontaly extending rod 72 connected with the upper end thereof and extending longitudinally outwardly in parallel relation to the sweep arm. The forward end of the horizontally extending portion of the lift device 68 is provided with a downwardly and forwardly inclined rod 74 which defines a cam surface for extending under and engaging the edge of a lift gate 24 towards which the sweep arm and carriage is moving so that it will lift the lift gate 24 with the arrangement being so constructed that the lift gate 24 will not be lifted until such time as the roller member 44 and specifically the notch 58 is in registry therewith so that any eggs on the egg tray will not roll off the egg tray but will either roll by gravity down the plate 52 or be engaged by the sweep arm 60 and guided through the notch 58 onto the plate 52 thus onto the belt 38.

The construction of the egg tray 16 which has the bottom edge provided with a vertical downwardly extending flange 20 provides added strength for the tray and also facilitates alignment. The continual line of egg gates retain the eggs on the egg tray with the gates being elevated by the egg gate lifter 68 on the sweep arm. The combined sweep arm and egg gate lifter functions to sweep or roll the eggs downward and across the egg tray 16 and then across the pan or plate 52 onto the conveyor belt 38. The specially constructed corrugated face on the sweep arm is for the purpose of longitudinally lining the eggs up on the lower section of the egg tray in single file so that only one egg at a time rolls across the pan or plate 52 which bridges the gap between the egg tray and the conveyor belt 38. In this construction, all components except for the egg tray and the egg gates are affixed to and travel with the moving carriage 32 and the egg tray and egg gates are a part of the cage assembly. The carriage may be identical to or similar to the carriage used for the mounting and operating of the feeding and manure removing devices as disclosed in Patent No. 3,158,137 and the number of egg gathering devices in any particular installation will be determined by the number of rows of cages.

It is also pointed out that the longitudinal movement of each egg being transferred from the egg tray to the conveyor belt 38 is such that, in effect, the egg will remain at longitudinal rest as it is being momentarily moved transversely from the egg tray to the conveyor belt. This is accomplished by the carriage 32 while gathering eggs moving in the direction illustrated in FIGURE 1 to the right at a fixed linear rate. Correspondingly, the belt 38 is driven by any suitable means at the same linear rate but in the opposite direction or to the left as indicated in FIGURE 1. Thus, each egg remains at longitudinal rest as it is being momentarily moved transversely from the egg tray to the conveyor belt. This, of course does not take into account the small frictional or slipping movement which may occur during its transfer to the belt. This structure is a factor in reduction of breakage of eggs on the conveyor belt and provides for efficient operation with very little egg damage.

The egg packing station 48 and the seat attached to the carriage for the operator have no particular specific details and may be of any suitable construction for the purpose of further processing the eggs if desired. As illustrated, the hinge structure 54 may be provided with a coil spring structure 55 to resiliently bias the plate 56 toward the flange 20 on the egg tray for retaining the structural components orientated in the desired position. As illustrated in FIGURE 3, the pivot axis 64 for the combined sweep arm and gate lifting device is above the lower edge of the egg tray to enable the device to be effectively employed even though the egg tray may have some variations in vertical orientation.

As the sweep arm and egg gate opening device move longitudinally of the cage line, the egg gate will immediately close when the lifting device passes beyond the edge of the gate so that the gate will retain any eggs as they roll out from under the hen so that such eggs will be held for the next gathering of eggs. The gate being opened by the lifting device is fully opened as the preceding gate is closed and the next succeeding gate has been engaged by the lifting device to initiate lifting operation thereof.

The sweep arm 60 is provided with a skid 76 attached to the undersurface thereof adjacent the outer end which allows the free end of the sweep arm 60 to ride on the wire mesh surface of the egg tray 16 inasmuch as the skid 76 has slightly inclined surfaces which engage the wire mesh material forming the egg tray 16.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An egg gathering device for use in combination with a battery of egg laying cages orientated in alignment with each cage having an egg tray including a longitudinal discharge edge and an egg retaining gate overlying the egg tray and retaining eggs on the egg tray, a carriage movable longitudinally of the cages, said egg gathering device comprising belt egg conveyor means mounted on said carriage and including a longitudinal run disposed alongside of the longitudinal discharge edge of the egg trays on the cages, and a combined egg sweep arm and egg gate lifting device mounted on the carriage for engaging the egg gates for lifting the gates and engaging eggs on the egg tray and sweeping them onto the conveyor means.

2. The structure as defined in claim 1 wherein said sweep arm and gate lifting device including an elongated arm, means pivotally supporting said arm from the carriage for pivotal movement about an axis inclined in relation to the egg tray for movement of the end of the sweep arm projecting into overlying engagement with the egg tray in a vertical direction for enabling the sweep arm to ride over variations in elevational position of the egg tray, the edge of the sweep arm adapted to contact eggs being orientated in acute angular relation to the longitudinal edge of the egg tray for sweeping eggs from the egg tray onto the conveying means.

3. The structure as defined in claim 2 wherein the edge of said sweep arm adapted to engage the eggs including a plurality of generally V-shaped projections thereon to retain eggs engaged thereby in single file to reduce breakage thereof.

4. The structure as defined in claim 3 wherein said conveying means is in the form of an endless belt conveyor having an egg receiving surface which moves in opposite direction to the direction of movement of the carriage, and a plate mounted on said carriage for bridging the gap between the edge of the conveyor belt and the edge of the egg tray.

5. The structure as defined in claim 4 wherein said conveyor includes upstanding side walls the side wall of the conveyor facing the egg tray having an open notch formed therein, said sweep arm being mounted adjacent the rear of the notch.

6. The structure as defined in claim 5 wherein said carriage includes a pivotal plate mounted on the edge thereof and spring means urging the pivotal plate into contact with the egg tray.

7. The structure as defined in claim 6 wherein said sweep arm includes an upstanding gate lifting rod mounted on the upper surface thereof with the rod including an upwardly inclined surface for engaging the lift gate to lift the lift gate into position for discharging eggs therefrom.

8. The structure as defined in claim 7 wherein the egg conveying surface is moving in a direction opposite to the direction of movement of the carriage at an equal and opposite linear rate so that as the egg moves from the egg tray onto the conveyor, the egg will be momentarily longitudinally at rest.

References Cited

UNITED STATES PATENTS

| | | | |
|---|---|---|---|
| 2,314,344 | 3/1943 | Cornell | 119—18 |
| 2,966,884 | 1/1961 | Naraghi | 119—22 |
| 2,987,038 | 6/1961 | Cole | 119—18 |
| 3,109,413 | 11/1963 | Patchett | 119—48 |
| 3,139,859 | 7/1964 | Naraghi | 119—48 |
| 3,145,793 | 8/1964 | Ray | 119—48 X |

ALDRICH F. MEDBERY, *Primary Examiner.*

SAMUEL KOREN, *Examiner.*